Figure 1:
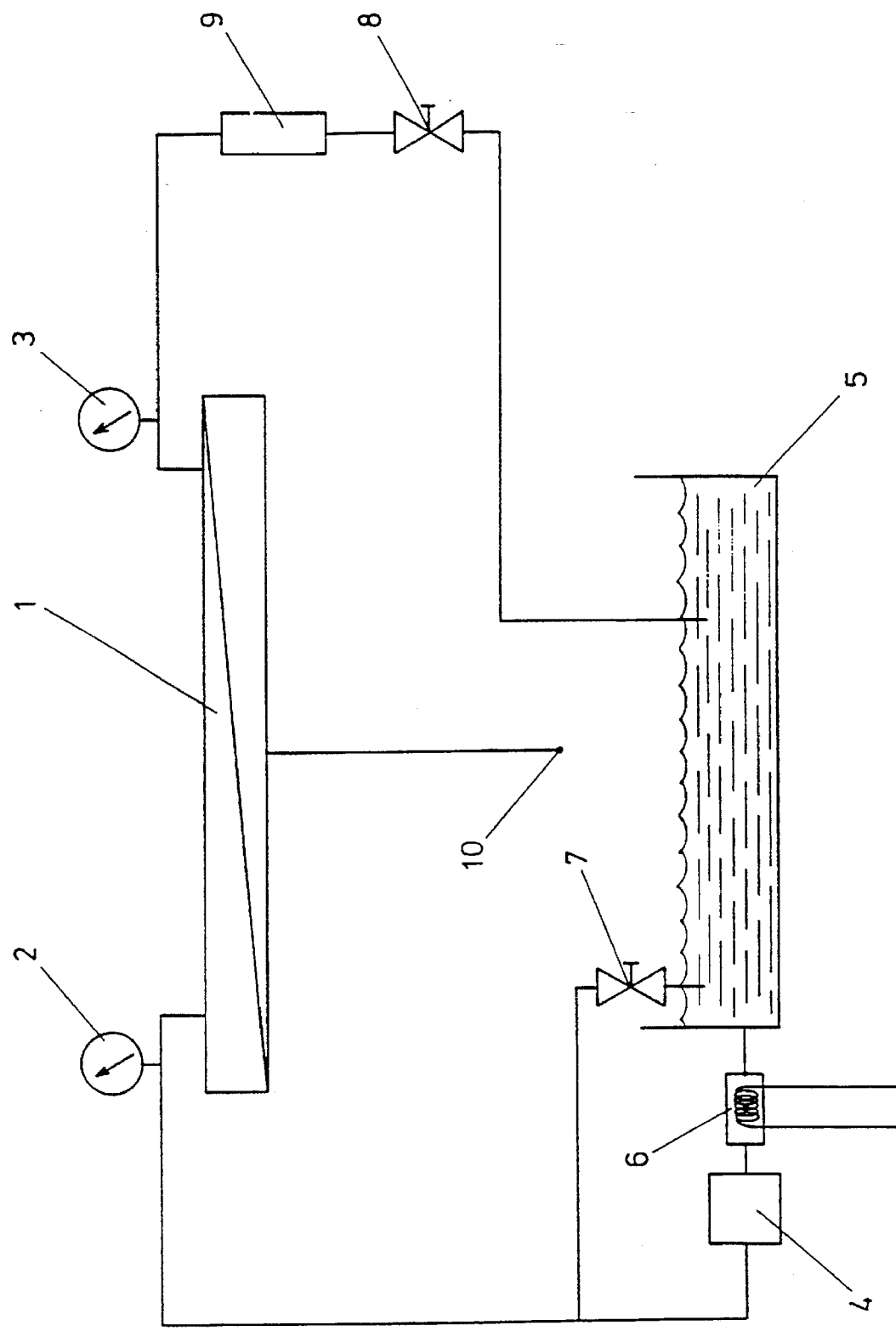

United States Patent [19]

McLoughlin et al.

[11] Patent Number: 5,639,365

[45] Date of Patent: Jun. 17, 1997

[54] FLUID FILLED AND COLLAPSING POLYMERIC FILTER TUBE HAVING A SUPPORTING SLEEVE

[75] Inventors: Robert Hamilton McLoughlin, Swindon; John Anthony Cook, Farringdon, both of Great Britain

[73] Assignee: Scimat Limited, United Kingdom

[21] Appl. No.: 491,956

[22] PCT Filed: Jan. 12, 1994

[86] PCT No.: PCT/GB94/00058

§ 371 Date: Sep. 12, 1995

§ 102(e) Date: Sep. 12, 1995

[87] PCT Pub. No.: WO94/15703

PCT Pub. Date: Jul. 21, 1994

[30] Foreign Application Priority Data

Jan. 14, 1993 [GB] United Kingdom ............... 9300618
Apr. 23, 1993 [GB] United Kingdom ............... 9308440

[51] Int. Cl.⁶ .................................................. B01D 33/52
[52] U.S. Cl. ............... 210/232; 210/321.67; 210/321.74; 210/321.83; 210/356; 210/359; 210/387
[58] Field of Search ............... 210/321.67, 321.74, 210/321.78, 321.83, 321.87, 354, 356, 359, 387, 232

[56] References Cited

U.S. PATENT DOCUMENTS

| | | |
|---|---|---|
| 2,864,506 | 12/1958 | Hiskey . |
| 3,521,753 | 7/1970 | Schoening . |
| 3,989,626 | 11/1976 | Bentley et al. . |
| 4,765,906 | 8/1988 | Downing et al. . |
| 4,787,982 | 11/1988 | Caro et al. .................. 210/321.67 |
| 5,256,288 | 10/1993 | Lee .............................. 210/321.67 |

FOREIGN PATENT DOCUMENTS

| | | |
|---|---|---|
| 2185906 | 8/1987 | United Kingdom . |
| WO86/05413 | 9/1986 | WIPO . |

*Primary Examiner*—W. L. Walker
*Attorney, Agent, or Firm*—Lerner, David, Littenberg, Krumholz & Mentlik

[57] ABSTRACT

A filter consisting of a filter tube of a porous polymeric material having tendency to collapse towards a predetermined flattened configuration and a porous support sleeve disposed around the filter tube, so as to support the filter tube against internal fluid pressure, while providing no more resistance to flow of fluid than the filter tube.

19 Claims, 4 Drawing Sheets

FLUID FILLED AND COLLAPSING POLYMERIC FILTER TUBE HAVING A SUPPORTING SLEEVE

This invention relates to a filter, to a method of making a filter, and to separation systems which include filters.

U.S. Pat. No. 2,864,506 discloses a device for ultrafiltration, which comprises a tubular membrane and a porous sleeve which surrounds the membrane along its entire length. A fluid which is to be filtered can be passed through the membrane from the supply end to the collection end under pressure. Filtrate passes through the membrane and the sleeve. Material in the fluid which is unable to pass through the membrane remains in the fluid, so that the concentration of that material in fluid leaving the membrane at the collection end thereof is increased. This filtration technique is sometimes referred to as cross-flow filtration.

Examples of materials said to suitable for use for the tubular membrane include cellulose, parchment, rubbers and plastic materials, selected according to the nature of the filtration to be accomplished. Examples of materials said to be suitable for the porous sleeving include cotton, nylon, muslin, copper, stainless steel and glass.

A problem which is encountered in connection with cross-flow filtration systems is that of cleaning any residue which collects on the internal surfaces of the membrane filter. This problem is significant: if collected material cannot be displaced from the filter surface, the entire filtration device must be replaced. This is undesirable because of the costs involved.

The problem is solved in the device disclosed in U.S. Pat. No. 4,765,906 by use of a double ply of a filter support material in which is disposed a layer of particulate filter material, such as floc, cellulose, kieselguhr, possibly with a second coating such as of a metal hydroxide. Residue is removed from the device by washing, which removes the residue together with the particulate filter material. The filter material must be replaced before the device can be used again.

It has been found that the problem of cleaning a filter, such as might be used in a cross-flow filtration system, can be solved by use of a filter whose configuration tends to change, towards a flattened configuration, when fluid pressure within it is relaxed.

Accordingly, in one aspect, the invention provides a filter which comprises:
(a) a filter tube of a porous polymeric material, which is set so that it has a tendency to collapse towards a pre-determined flattened configuration, and
(b) a porous support sleeve disposed around the filter tube to support it against internal fluid pressure while providing no more resistance to flow of fluid than the filter tube.

In another aspect, the invention provides a method of making a filter, which comprises:
(a) forming a porous filter tube of a polymeric material, which is set so that it has a tendency to collapse towards a pre-determined flattened configuration, and
(b) providing a support sleeve around the filter tube to support the filter tube against internal fluid pressure while providing no more resistance to flow of fluid than the filter tube.

The filter of the present invention has the advantage that material which collects on the internal surface of the filter tube during a filtration process, for example during cross-flow filtration, is dislodged when the tube collapses towards its pre-determined flattened configuration. The collapse takes place when pressure in the filter tube is relaxed.

Preferably, the support sleeve is set so that it too has a tendency to collapse towards a pre-determined flattened configuration. This has the significant advantage of enhancing the collapse of the filter tube, and therefore the release of collected material from the internal surface of the filter tube, especially when the filter tube and the support sleeve are oriented relative to one another such that they align with one another when they collapse.

The flattened configuration of the filter tube, and of the support sleeve when applicable, is a flattened configuration which is pre-determined, in the sense that the tube or sleeve reverts always to that configuration when internal fluid pressure is released. The flattened configuration will generally involve the tube or sleeve being folded along at least two fold lines, and the tube or sleeve will tend to fold along the same lines when it collapses. Especially when the tube or sleeve has two fold lines, they will be disposed diametrically opposite to one another, so that the tube or sleeve is essentially flat (subject to the ease with which the material of the tube or sleeve can be folded) when in the collapsed configuration.

The support sleeve can advantageously be formed from a fabric, formed in turn from a fibre. For example, the fabric may be formed, for example, by knitting, braiding or weaving. A woven fabric can be formed with at least one of the fold lines by which the sleeve can be made to adopt a flattened configuration. By appropriate arrangement of the weaving equipment, the sleeve can be formed with a plurality of the fold lines, as required to cause the sleeve to adopt the flattened configuration. Similarly, a knitted fabric can be formed with required fold lines.

The support sleeve can be formed separately from the filter tube, and the filter can be made by locating the filter tube inside the support sleeve. The support sleeve can however be produced directly around the filter tube.

It can be preferred to provide discontinuities in the support sleeve which cause the internal cross-section of the support sleeve to vary along its length, and therefore also of the filter tube, at least when in contact with the internal surface of the support sleeve as a result of fluid pressure. This might be achieved when the support sleeve is formed by weaving by selection of an appropriate weave pattern. For example, combinations of twill, plain and hop sack with single or multiple weave patterns may be used. The characteristics of the sleeve can be varied from one region of the sleeve to another, for example by varying the weave density, the fibre diameter or stiffness, or by incorporating more fibres in the selvage of the sleeve, for example in order to introduce variations in the stiffness of the sleeve. Discontinuities might also be introduced by means of externally applied components, such as clips. Variations in the cross-section of the filter tube can give rise to turbulence in fluid flowing in the tube, which can lead to reductions in accumulation of material on the internal surface of the tube.

The material of the sleeve can be varied from one region of the sleeve to another, for example to introduce variations in the stiffness of the sleeve. For example, portions of a stiff filament, or of an elastomeric material, can be incorporated in regions of the sleeve.

A preferred support can provide support sleeves for a plurality of filter tubes. For example, a support formed from parallel spaced lengths of woven material, whose plies are seamed together along spaced longitudinal seams to provide separate sleeves between adjacent seams, can provide support for a plurality of filter tubes, one in each support sleeve. It will be preferred in this embodiment that the plane towards which the filter tube tends to flatten is substantially parallel to the plane of the sheet.

A preferred material for the support sleeve is a non-woven fabric, for example formed by wet laying, air laying, melt spinning, spun bonding or needle punching processes, as appropriate to the material from which the fabric is manufactured.

The sleeve can be formed from a fibre of a metallic material, or of a natural or synthetic polymeric material, or from fibres of different materials. Examples of suitable materials include stainless steels, polyamides, polyesters, polyolefins such as polypropylenes and high molecular weight polyethylenes, polyimides, naturally fibrous substances such as cotton and silk, inorganic fibrous substances such as might be made from carbon, glass and boron, and natural inorganic substances such as asbestos. Particularly preferred fibres include those formed from polypropylene.

The support sleeve will be made to collapse towards its flattened configuration using a technique selected according to the material of the sleeve. For example, if the material is capable of being deformed plastically by the application of force, this technique can be used to crease the material of the sleeve. Another technique which might be employed involves the application to the sleeve of heat, while the sleeve is retained in its flattened configuration, so as to set the sleeve in its flattened configuration. This technique lends itself particularly to certain polymeric materials. A combination of techniques can of course be employed.

Preferably, the external width of the filter tube when laid flat is less than about 95% of the internal width of the support sleeve when laid flat. This has the advantage that the filter tube is capable of expanding within the support tube when placed under pressure from fluid within it. More significantly, the tube tends to contract when fluid pressure is relaxed, causing material built up on the internal surface of the tube to be released. This facilitates cleaning of the tube of collected material. It is particularly preferred that the material of the filter tube is such that the filter tube stretches under fluid pressure within it, and that the tendency of the support sleeve to stretch is less than that of the filter tube. In this way, the filter tube can be stretched satisfactorily under the pressures exerted by fluid within it, to engage the internal surface of the support sleeve.

In another aspect, the invention provides a filter which comprises:
 (a) a filter tube of a porous polymeric material, and
 (b) a porous support sleeve disposed around the filter tube to support it against internal fluid pressure while providing no more resistance to flow of fluid than the filter tube,
in which the external width of the filter tube when laid flat is less than about 95% of the internal width of the support sleeve when laid flat, and in which the tendency of the support sleeve to stretch laterally under internal fluid pressure is less than that of the filter tube, so that the filter tube is capable of being stretched by fluid under pressure within it to engage the internal surface of the support sleeve.

Preferably, the filter tube has a porosity of at least about 35%, especially at least about 50%, for example about 75%, determined by comparison of a calculated density of the membrane derived from the weight and dimensions of a sample, and the theoretical density of the components of that sample. It is preferred that the polymeric material of the filter tube be microporous, for example so that details of the structure of the pores of the tube are discernable only by microscopic examination which can resolve details of structure below 500 nm. It will generally preferred that there are many pathways between opposite surfaces of the membrane. Preferably, the mean pore size is less than about 10 μm, more preferably less than about 4 μm, especially less than about 1 μm, for example about 0.3 μm. The mean pore size could be significantly smaller than these values, for example less than 150 nm, making the filter of the invention suitable for use in ultrafiltration applications.

Preferably, the thickness of the wall of the filter tube is less than about 500 μm, more preferably less than about 300 μm, especially less than about 150 μm, for example less than about 75 μm.

The filter tube can conveniently be formed from a polymeric material by one or more of techniques which include removing a pore forming substance from the material, and stretching the material. For example, the tube can be made from a polymeric material which includes a filler. A material can be selected for the filler which is inert towards substances with which the filter will come into contact when in use. This allows the filler to remain in the material of the filter tube.

Preferably, the tube is made from a blend of a polymeric material and a filler, by forming the blend into a film and stretching the film to render it porous. The film may be formed into a tubular article by folding and sealing the folded film. The film may be formed directly as a tubular article, for example by extrusion. The blend may include additives which facilitate the deformation of the film to render it porous, such as, for example, appropriate plasticisers. Particularly appropriate additives include plasticisers which are substantially immiscible with the polymer of the blend, in the absence of filler.

Preferably, the filler is present in the blend in an amount of about 50 to about 350 parts by weight, more preferably from about 100 to about 250 parts, per hundred parts by weight of polymer. Plasticiser may be present in an amount from about 1 to 50 parts by weight, more preferably from about 20 to about 40 parts, per hundred parts by weight of polymer.

The blend may include other additives, such as antioxidants, UV stabilisers, processing aids, dispersal aids and so on. A preferred dispersal aid comprises a fatty acid salt, especially a stearate. It may be added directly to the polymer composition, or be formed by reaction of the filler with stearic acid. Preferably, the ratio of the dispersal aid to filler is from about 1 to about 10 by weight.

The degree to which the film formed from the blend is deformed may depend on a number of factors, including for example the nature of the polymer, the filler and any plasticiser present, whether the plasticiser or filler is to be extracted from the pores, the required pore size and so on. Generally, a high degree of deformation is preferred, to create a high degree of porosity. For example, the film may be stretched so that the dimension in the direction of stretching increases by at least about 50%, preferably, at least about 100%, more preferably at least about 250%, for example at least about 450%. By this process, the thickness of the film can be reduced by a factor of five or more.

The polymeric material of the filter tube can be selected from polymers of compounds with one or more polymerisable double bonds, or condensation polymers of condensable compounds.

Useful polymers of compounds with polymerisable double bonds may be selected from polymers of ethylenically unsaturated hydrocarbons, having 2 to 12 carbon atoms, such as ethylene, propylene, n-dodecene, and of vinyl ethers such as methyl or ethyl vinyl ether. The compounds can be substituted, for example halogenated. Copolymers of these compounds can also be useful.

Useful condensation polymers include polyamides of diamines and dicarboxylic acids.

Examples of particularly preferred polymers for the filter tube include:

Polyethylene
Polypropylene
Polybutylene
Poly(4-tert-butylstyrene)
Poly(vinyl methyl ether)
Poly (vinylidene fluoride)
Ethylene/tetrafluoroethylene copolymer
Tetrafluoroethylene hexafluoropropylene copolymer
Ethylene/chlorotrifluoroethylene copolymer
Poly(6-aminocaproic acid)
Poly(11-aminoundecanoic acid)
Poly(ethyleneterephthalate)
Poly(butyleneterephthalate)
Poly(decamethylene sebacamide)
Poly(heptamethylene pimelamide)
Poly(octamethylene suberamide)
Poly(nonamethylene azelamide)
Poly(hexamethylene adipamide)

Examples of plasticisers which might be used in the blend from which the filter tube is made include ethylene carbonate, propylene carbonate, ethylene glycol, dimethylether, tetrahydrofuran, tryglyme, tetraglyme and selected polyethylene oxides and polyethylene glycols. It can be appropriate to extract the plasticiser from the blend after the article formed from the blend has been stretched. This can best be done by means of an appropriate solvent.

Examples of suitable fillers for the material of the filter tube include:

salts such as metal oxides and hydroxides (for example of calcium, magnesium, barium, aluminium, titanium, iron and tin); carbonates (for example of calcium, magnesium, and lithium); and chlorides and sulphates (for example of sodium, potassium, calcium and lithium).

minerals, such as mica, montmorillorite, kaolinite, cellopulgite, asbestos, talk, diatomaceous earth and vermiculate, synthetic and natural zeolites, and Portland cement.

silica, precipitated metal silicates such as calcium silicate, aluminium polysilicate, aluminium silica gels, glass particles including solid and hollow microspheres, flakes and fibres.

Preferably, the filler comprises particles which are approximately spherical. Suitable particles have a diameter less than about 10 μm, especially less than about 5 μm, for example less than about 3 μm. It has been found that these materials can enable membranes to be produced with uniform pores having a narrow spread of diameters, which can be predicted from the mean diameter of the filler spheres. Furthermore, the physical properties of the membranes can be enhanced compared with the properties of materials made using filler particles which are not spherical.

The filter of the invention can include means for deforming the filter mechanically, to cause material accumulated on the internal surface of the filter tube to be dislodged. For example, the filter assembly might include one or more rollers which can be passed over the filter, from one end thereof towards its other end. It is particularly preferred that there be two rollers, to act on opposite sides of the filter. The filter can also include means for driving the deformation means along the filter.

In a further aspect, the invention provides a separation system which includes a filter of the type referred to above.

The filter can be arranged spirally. Preferably, the filter is arranged so that the plane towards which the filter tube tends to flatten deviates significantly from perpendicular to the axis of the spiral, and preferably is substantially parallel to that axis. For example, the angle between the plane and the axis might be less than about 45°, preferably less than about 30°, especially less than about 10°.

Preferably, the separation system including the filter includes means for supporting the filter in its arrangement, for example its spiral arrangement. This might comprise, for example, an array of pins which the filter is wound around. In this embodiment, it is preferred that the plane towards which the filter tube tends to flatten deviates significantly from perpendicular to the axis of the spiral. The turbulence imparted at each pin, where the tube is deformed, can reduce accumulation of material on the internal surface of the filter tube.

The separation system of the invention might include a plurality of the filters of the invention, connected in parallel in the direction of flow of liquid to be filtered by means of appropriate headers. For example, three of the filters might be fitted in the direction of flow of liquid by means of two headers; a first header splits the flow from a supply conduit into the three filters, and a second header combines the flow from the three filters into a collection conduit.

Connections to the filter of the invention can be made conveniently using conventional fittings used for forming connections to fluid carrying tubes. This feature has the advantage of allowing connections to be made simply and conveniently, and at low cost. The advantage arises, in part, from the robust nature of the filter of the invention, in particular of the filter tube component.

The transverse dimensions of the filter will be selected according to the characteristics of the filtration operation; smaller filters can give rise to a greater efficiency, because of the smaller volumes of liquid which pass through the filter. It has been found that a convenient size for the support sleeve is an external diameter which is less than about 50 mm, for example about 12 mm, but possibly less than about 8 mm for some applications. The diameter is preferably greater than about 3 mm, for example greater than about 5 mm.

While the filter of the invention finds particular application in cross-flow filtration systems, it is also envisaged that it can be used in filtration systems in which a fluid to be filtered flows into the filter tube at one end, the tube being sealed at its other end, so that fluid leaves the filter only through the filtration surfaces of the filter tube, and subsequently the support sleeve. With this device, the residue retained by the filter tube can easily be recovered by periodically opening the closed end of the filter and flushing it out into a separate vessel.

The present invention will be now be described with reference to examples.

1. FORMATION OF POROUS POLYMERIC MATERIAL TUBE (a) The following materials were mixed and pelletised by melt blending on a twin screw extruder proportions indicated by weight:

| | |
|---|---|
| Linear low density polyethylene (Sclair 8405) | 100 |
| Lithium carbonate (particle size <5 μm) | 110 |
| Lithium stearate | 1.1 |

The resulting blend was formed into a flat sheet by extrusion. The sheet was stretched in the machine direction 450%. A strip of the sheet was folded, and a seam was formed about 20 mm from the fold to form a tube. The tube was set in a flattened configuration by the application of heat and pressure. The tube had a mean pore size of about 0.25 μm measured using a Coulter porometer, and a wall thickness of about 30 μm.

(b) The following materials were mixed and pelletised by melt blending in a twin screw extruder, proportions indicated by weight:

| Linear low density polyethylene (Sclair 8405) | 100 |
| Spherical glass (Potters-Ballotini Grade 5000) | 140 |
| Lithium stearate | 1.4 |

The blend formed into a tube by melt extrusion through a cross-head die using a 25 mm pin and die set. The extruded tube was sized by inflation with air, and drawn down into a flattened configuration. The flattened tube was reheated to 90° C., and stretched longitudinally by 530% between nip rollers of differing speeds.

The tube had a diameter of about 12.5 mm, a mean pore size of about 1.7 μm measured using a Coulter porometer, and a wall thickness of about 60 μm.

(c) The following materials were mixed and pelletised by melt blending in a twin screw extruder, proportions indicated by weight:

| Polypropylene (Appryl Grade 3030FNI) | 100 |
| Spherical glass (Potters-Ballotini Grade 0-3CP00) | 150 |
| Lithium stearate | 1.5 |

The blend was formed into a tube by melt extrusion through a cross-head die using a 25 mm pin and die set. The extruded tube was sized by inflation with air, and drawn down into a flattened configuration. The flattened tube was reheated to 105° C., and stretched longitudinally by 530% between nip rollers of differing speeds. The tube had a mean pore size of about 0.24 μm measured using a Coulter porometer.

(d) The following materials were mixed and pelletised by melt blending in a twin screw extruder, proportions indicated by weight:

| Linear low density polyethylene (Sclair 8405) | 100 |
| Lithium carbonate (maximum particle size 6 μm) | 200 |
| Lithium stearate | 2 |

The blend was formed into a tube by melt extrusion through a cross-head die using a 25 mm pin and die set. The extruded tube was sized by inflation with air, and drawn down into a flattened configuration. The flattened tube was reheated to 90° C., and stretched longitudinally by 530% between nip rollers of differing speeds.

The tube had a diameter of about 12.5 mm, a mean pore size of about 0.7 μm measured using a Coulter porometer, and a wall thickness of about 70 μm.

2. FORMATION OF SUPPORT SLEEVE

Two sheet of a non-woven polypropylene fabric, supplied by Freudenberg type FS 2123, were placed in face to face contact, and joined to each other by two parallel welds, about 20 mm apart, using an industrial bag sealer. Excess fabric was removed, to produce a flat tube.

3. DEAD-END FILTRATION

A filter formed from the filter tube of Example 1a and the support sleeve of Example 2 was connected to a domestic water supply at one end using nylon tube connection fittings conventionally used to form connection to domestic and industrial hoses. The filter was closed at its other end by folding the end of the filter and retaining the fold in place by means of a clip.

Water was supplied to the filter and was seen to permeate through the walls of the filter tube and the support sleeve. Subsequent examination of the internal surface of the filter tube revealed a layer of retained material with a yellow/brown appearance.

4. CROSS-FLOW FILTRATION OF YEAST SOLUTION 4.1 A filter formed from the filter tube of Example 1a and a woven polyester tube supplied by InHome Limited under the designation "Standard Green Tube", was challenged with mains water using the test rig shown schematically in FIG. 1 of the accompanying drawings. The test rig includes the sample 1 of the filter, inlet and outlet pressure gauges 2, 3, a pump 4 for liquid to be circulated through the filter, a reservoir 5 for the liquid, a heat exchanger 6, a pressure control valve 7, a flow control valve 8, a flow gauge 9, and a sampling point 10 from which filtrate can be collected. The water was supplied to the filter at a pressure of 2 bar and a cross-flow rate of 2 l.min$^{-1}$ for 2 hours. The membrane flux was calculated to be 88.7 l$^{-1}$.m$^2$.h$^{-1}$ after 2 hours.

A similar filter was challenged with a 0.5% yeast solution made by dispersing a commercially available dried baker's yeast in tap water at a pressure of 2 bar and a cross-flow rate of 2 l.min$^{-1}$ for 2 hours. The membrane filtrate was calculated to be 18 l$^{-1}$.m$^2$.h$^{-1}$ after 2 hours. The turbidity of the filtrate was determined by its UV absorbance at 595 nm. It was found to be less than that of the feed solution by a factor greater than 1000.

4.2 A sample of the filter tube of Example 1b, length 160 mm, was inserted into the woven polyester tube referred to in Example 3.2 above. The resulting filter was installed on the test rig shown schematically in FIG. 1 of the accompanying drawings.

The filter was challenged with mains water at an input pressure of 2 bar and a crossflow rate of 4 l.min$^{-1}$. After 30 minutes, the transmembrane flux was calculated to be 142 l$^{-1}$.m$^2$.h$^{-1}$.

The filter was then challenged with a 0.5% yeast solution, made as described above. After 300 minutes, the transmembrane flux was calculated to be 14.4 l$^{-1}$.m$^2$.h$^{-1}$. The turbidity of the filtrate was determined by its UV absorbance at 595 nm. It was found to be less than that of the feed solution by a factor greater than 500.

4.3 A sample of the filter tube of Example 1c, length 160 mm, was inserted into the woven polyester tube referred to above in Example 3.2. The resulting filter was installed on the test rig shown schematically in FIG. 1 of the accompanying drawings.

The filter was challenged with mains water at an input pressure of 2 bar and a cross-flow rate of 2 l.min$^{-1}$. After 30 minutes, the transmembrane flux was calculated to be 99 l$^{-1}$.m$^2$.h$^{-1}$.

The filter was then challenged with a 0.5% yeast solution, made as described above. After 30 minutes, the transmembrane flux was calculated to be 18 l$^{-1}$.m$^2$.h$^{-1}$. The turbidity of the filtrate was determined by its UV absorbance at 595 nm. It was found to be 1000 times less than that of the feed solution.

5. COLLAPSE OF FILTER

A filter formed from the filter tube of Example 1d and a woven polyester tube supplied by InHome Limited under the designation "Standard Green Tube". The resulting filter was installed on the test rig shown schematically in FIG. 1 of the accompanying drawings.

The filter was challenged with contaminated industrial water at an input pressure of 2 bar and a cross-flow rate of 2.2 l.min$^{-1}$ for a period of 48 hours. The supply of water was then cut off and the filter allowed to empty for 5 minutes. The filter tube substantially regained its original flattened shape. It was then reconnected to the supply of water for a period of 55 minutes. This 60 minute cycle was repeated a further 7 times and the transmembrane flux was measured periodically. It was noted that, at the start of each cycle, the water discharged from the collection end of the filter was discoloured, indicating that the regained shape of the filter was accompanied by release of accumulated material from the internal surface of the tube.

Figure 2:
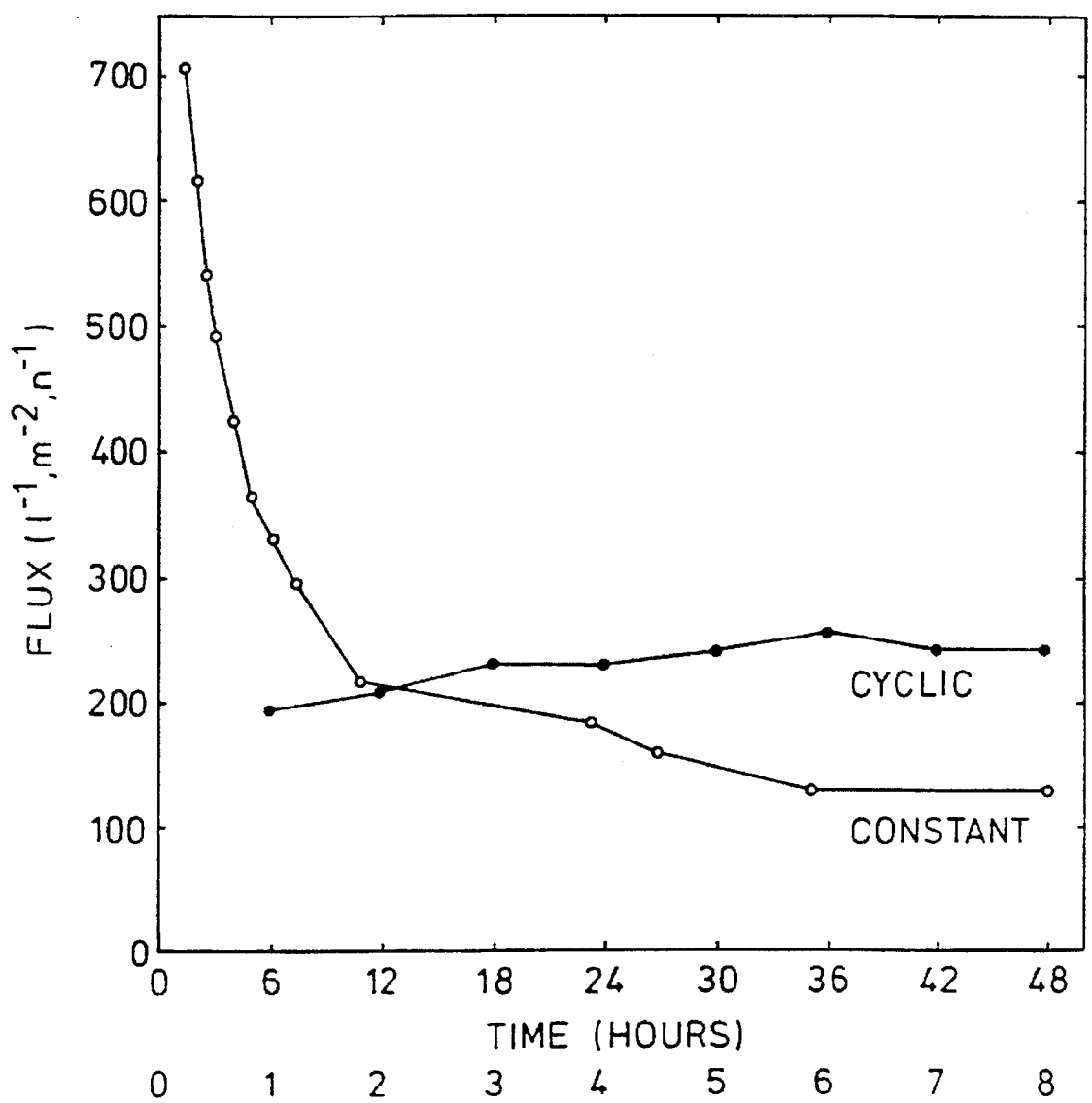

FIG. 2 shows how transmembrane flux varies with time, providing a comparison of performance under constant pressure conditions, and conditions in which the pressure is varied cyclically, respectively.

6. ADDITIONAL SEPARATION SYSTEMS 6.1 The filter referred to above in Example 4.3 was adapted by fitting to it of four spring clips at intervals of 2.7 cm. As a result, the transverse dimension of the filter was reduced from about 15 mm to about 7 mm.

It was found that the transmembrane flux tested in cross-flow mode with the 0.5% yeast solution was about 50% higher after 300 minutes than was found without the clips, tested at the same crossflow rate and pressure. There was no significant difference in the turbidity of the filtrate from the two experiments.

6.2 A separation system was made from three filters referred to above in Example 4.3, each of length 1.0 m. The filters were connected to receive liquid in parallel by means of appropriate manifolds.

The system was challenged with contaminated industrial water at an input pressure of 3 bar and a combined cross-flow rate of 6 l.min$^{-1}$. During the test, the transverse dimension of the membrane was reduced from about 15 mm to about 9 mm at each of three points spaced about 25 cm apart, by means of rollers connected to a motorised drive unit. The drive unit causes the rollers to move backwards and forwards along the tubes. The transmembrane flux was measured periodically.

Figure 3:
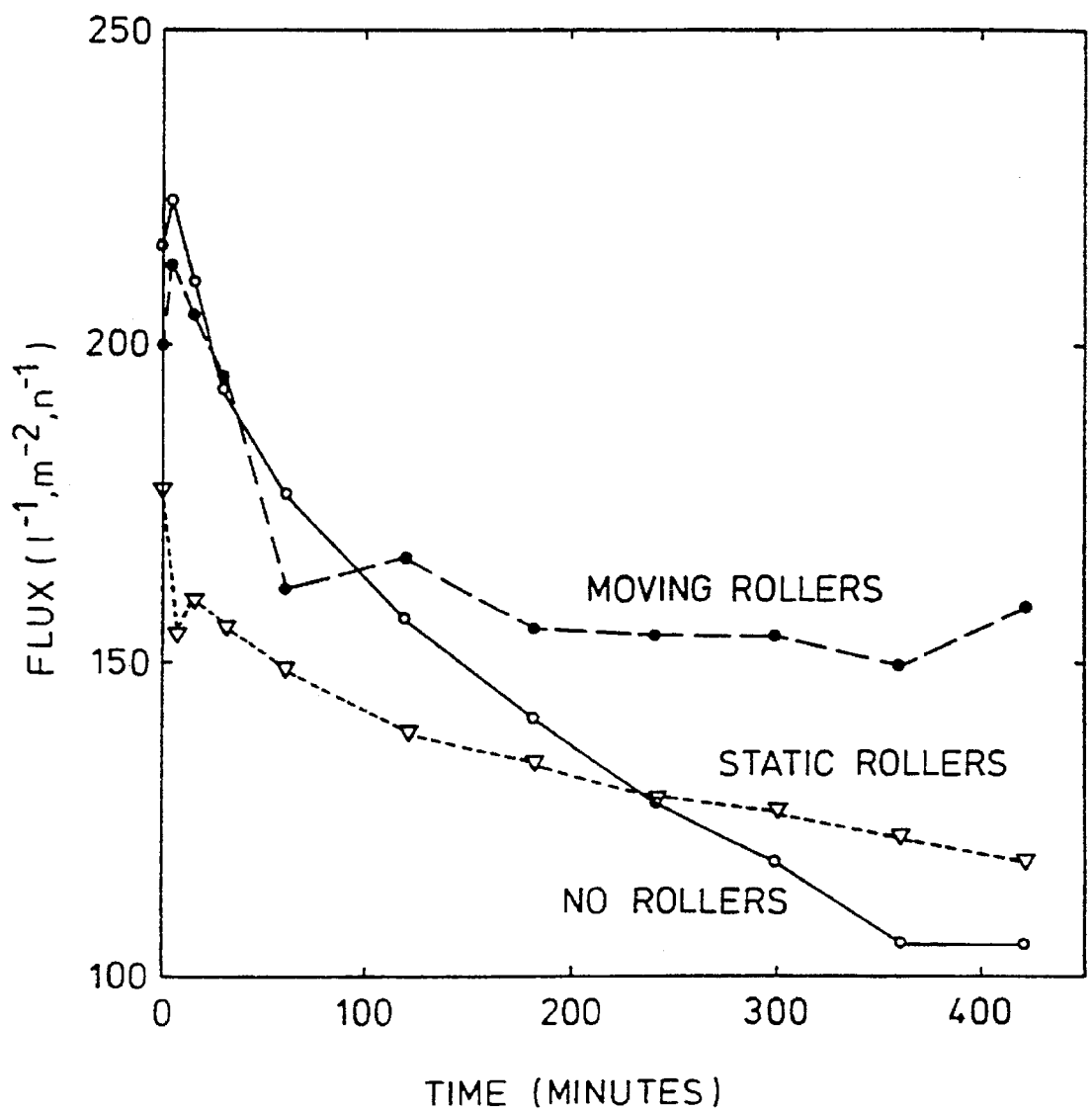

Changes in the transmembrane flux are shown in the graph of flux versus run time presented as FIG. 3, with comparative values for filters with stationary rollers, and with no rollers at all.

Figure 4A:
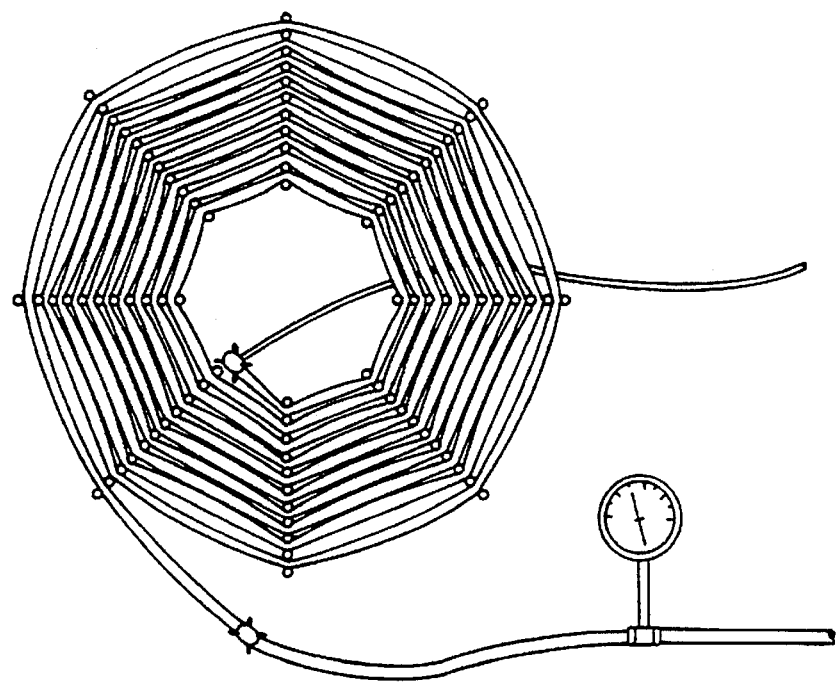
Figure 4B:
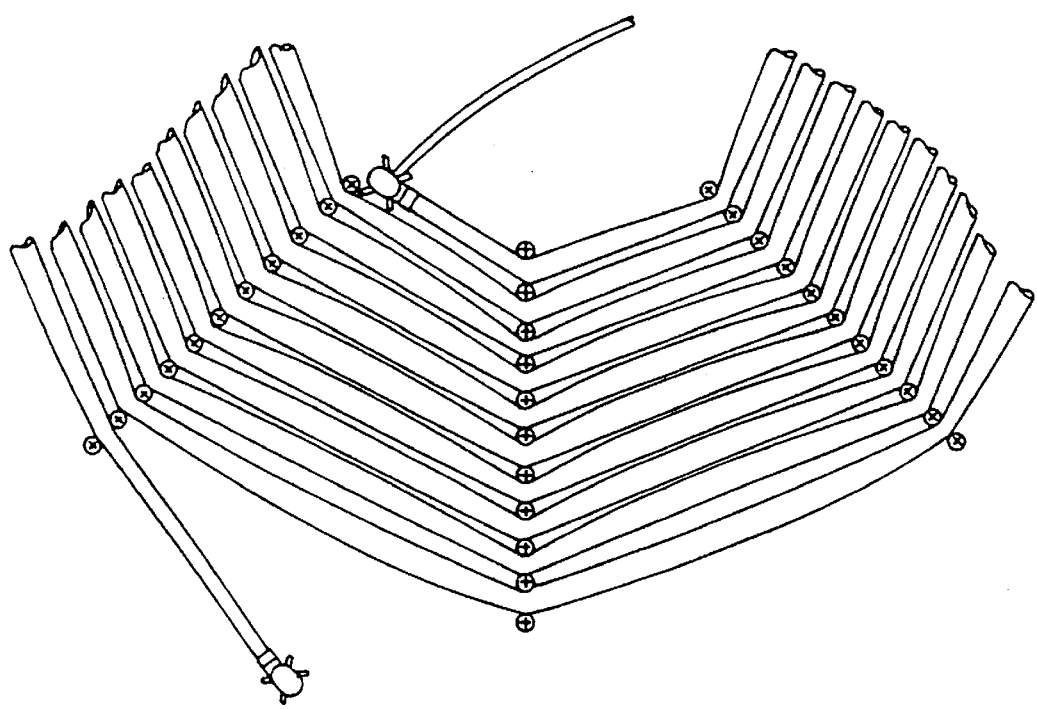

6.3 A separation system was made from a filter referred to above in Example 4.3, of length 13 m. It was wound into a spiral on a support provided by an array of pins, diameter 6 mm, height 25 mm, located at approximately 15 mm centres on lines at 45°, mounted on an acrylic sheet. The internal diameter of the wound filter was about 20 cm. A further acrylic sheet was mounted on the wound filter to retain it in place. The transverse dimension of the filter when pressurised was reduced from about 15 mm to about 9 mm at each of the pins, as a result of the distortion of the filter by the pins. The resulting system is shown in FIGS. 4a and 4b.

The system was supplied with a 1% solution of baker's yeast at an input pressure of 3 bar and a crossflow rate of 2 l.min$^{-1}$. The transmembrane flux was measured periodically. It was seen to drop from an initial value of at least 152 l$^{-1}$.m$^2$.h$^{-1}$ to a value of 39 l$^{-1}$.m$^2$.h$^{-1}$ after 400 minutes.

After 400 minutes, the turbidity of the filtrate was less than that of the yeast solution by a factor of at least 1000.

After 400 minutes, the crossflow rate and pressure were reduced to zero for 1 minute, allowing the filter tube to regain its original flattened shape. The retentate flow was then resumed for 60 seconds, at an increased rate of 8 l.min$^{-1}$, and reduced pressure of less than 0.5 bar. It was noted that the turbidity of the retentate increased dramatically during the 60 second flushing as the yeast accumulated on the internal surface of the filter tube was dislodged.

The filtration was resumed after the flushing operation, under the original test conditions. The initial transmembrane flux on resumption of the filtration was calculated to be 61 l$^{-1}$.m$^2$.h$^{-1}$, while the turbidity of the filtrate remained less than that of the yeast solution be a factor of at least 1000.

We claim:

1. A filter comprising:
   (a) a filter tube of a porous polymeric material having two predetermined fold lines extending along its length and a tendency to collapse towards a predetermined flattened configuration along said fold lines when fluid pressure within said filter is released, and
   (b) a porous support sleeve disposed around said filter tube so as to support said filter tube against internal fluid pressure while providing no more resistance to flow of fluid than said filter tube.

2. The filter as claimed in claim 1, wherein the support sleeve comprises a fabric formed from a fibre.

3. The filter as claimed in claim 2, wherein the fibre is selected from the group consisting of a metallic material and a polymeric material.

4. The filter as claimed in claim 2, wherein the support sleeve has a tendency of collapsing towards a predetermined flattened configuration, as a result of the application thereto of a force to deform the material of the sleeve so as to decrease it.

5. The filter as claimed in claim 2, wherein the support sleeve is heat set to have a tendency of collapsing towards a predetermined flattened configuration.

6. A separation system comprising a filter as claimed in claim 1 and a support for said filter, said filter being arranged spirally on said support.

7. The separation system as claimed in claim 6, wherein the filter is arranged in such a manner that a plane towards which the filter tube tends to flatten is substantially parallel to an axis of the spiral.

8. The separation system as claimed in claim 6, wherein the support means comprises an array of pins, so that the filter is wound around said array of pins.

9. The filter as claimed in claim 1, wherein said support sleeve has two predetermined fold lines extending along its length and a tendency to collapse towards a predetermined flattened configuration along said fold lines when fluid pressure within said filter is released.

10. The filter as claimed in claim 9, wherein said filter tube and said support sleeve are oriented relative to one another so that the respective fold lines in said filter tube and said support sleeve are aligned when said filter tube and said support sleeve collapse.

11. The filter as claimed in claim 1, wherein the filter tube has a porosity of at least 30%.

12. A method of making a filter comprising the steps of:
   (a) forming a porous filter tube of a polymeric material with two predetermined fold lines extending along its length and a tendency to collapse towards a predetermined flattened configuration along said fold lines when fluid pressure within said filter is released, and (b) providing a support sleeve around said filter tube to support said filter tube against internal fluid pressure while providing no more resistance to flow of fluid than said filter tube.

13. The method as claimed in claim 12, further comprising the step of setting the support sleeve, so that it tends to collapse towards a predetermined flattened configuration.

14. The method as claimed in claim 13, wherein the setting step comprises applying force to the support sleeve to deform the material of the sleeve.

15. The method as claimed in claim 13, wherein the setting step comprises applying heat to the support sleeve.

16. The method as claimed in claim 12, further comprising the step of stretching the tube of polymeric material, so as to make the material porous.

17. The method as claimed in claim 16, in which the tube is stretched while flattened.

18. A filter comprising:

(a) a filter tube of a porous polymeric material, and (b) a porous support sleeve disposed around the filter tube to support the filter tube against internal fluid pressure, while providing no more resistance to flow of fluid than the filter tube, whereby an external width of the filter tube when laid flat is less than about 95% of an internal width of the support sleeve when laid flat, and tendency of the support sleeve to stretch laterally under internal fluid pressure is less than that of the filter tube, so that the filter tube having a fluid under pressure is capable of being stretched by said fluid to engage an internal surface of the support sleeve.

19. A filter comprising:

(a) a filter tube of a porous polymeric material having a tendency to collapse towards a predetermined flattened configuration, and (b) a porous support sleeve disposed around said filter tube so as to support said filter tube against internal fluid pressure while providing no more resistance to flow of fluid than said filter tube, the external width of said filter tube in a laid flat configuration being less than about 95% of the internal width of said support sleeve in a laid flat configuration, and the tendency of said support sleeve to stretch laterally under internal fluid pressure being less than the tendency of said filter tube to stretch laterally under internal fluid pressure so that, when said filter tube contains a fluid under pressure, it is capable of being stretched by the fluid within it to engage the internal surface of said support sleeve.

* * * * *

UNITED STATES PATENT AND TRADEMARK OFFICE
CERTIFICATE OF CORRECTION

PATENT NO. : 5,639,365
DATED : June 17, 1997
INVENTOR(S) : Robert Hamilton McLoughlin; John Anthony Cook It is certified that error appears in the above-indentified patent and that said Letters Patent is hereby corrected as shown below:

Column 1, line 17, after "to" insert --be--.
Column 2, line 23, delete "for example".
Column 3, line 65, after "generally" insert --be--.
Column 5, line 41, delete "talk" and insert therefor --talc--.
Column 6, line 65, after "direction" insert --by--.
Column 7, line 58, "sheet" should read --sheets--.
Column 8, line 45, "14.41$^{-1}$, m$^2$.h$^{-1}$" should read --14.4 1$^{-1}$.m$^2$.h$^{-1}$--.
Column 9, line 6, "2.21.min$^{-1}$" should read --2.2 1.min$^{-1}$--
Column 10, line 15, delete "be" and insert therefor --by--.

Signed and Sealed this

Twenty-eighth Day of October, 1997

BRUCE LEHMAN

Attest:

Attesting Officer

Commissioner of Patents and Trademarks